(12) United States Patent
Mantkowski et al.

(10) Patent No.: US 9,205,509 B2
(45) Date of Patent: Dec. 8, 2015

(54) LOCALIZED CLEANING PROCESS AND APPARATUS THEREFOR

(75) Inventors: Thomas Edward Mantkowski, Madeira, OH (US); Meghan Meredith Olds, Houston, TX (US); Nripendra Nath Das, West Chester, OH (US)

(73) Assignee: General Electric Company, Schenectady, NY (US)

( * ) Notice: Subject to any disclaimer, the term of this patent is extended or adjusted under 35 U.S.C. 154(b) by 644 days.

(21) Appl. No.: 13/596,204

(22) Filed: Aug. 28, 2012

(65) Prior Publication Data

US 2013/0048015 A1 Feb. 28, 2013

Related U.S. Application Data

(60) Provisional application No. 61/529,622, filed on Aug. 31, 2011.

(51) Int. Cl.
| | |
|---|---|
| C23G 1/00 | (2006.01) |
| B23K 9/235 | (2006.01) |
| B23P 6/00 | (2006.01) |
| C23G 5/00 | (2006.01) |
| F01D 25/00 | (2006.01) |
| B23K 1/20 | (2006.01) |
| B23P 6/04 | (2006.01) |
| C23G 5/028 | (2006.01) |
| C23G 5/04 | (2006.01) |
| F01D 5/00 | (2006.01) |

(52) U.S. Cl.
CPC ............... *B23K 9/235* (2013.01); *B23K 1/206* (2013.01); *B23P 6/007* (2013.01); *B23P 6/045* (2013.01); *C23G 5/00* (2013.01); *C23G 5/02803* (2013.01); *C23G 5/04* (2013.01); *F01D 5/005* (2013.01); *F01D 25/002* (2013.01); *F05D 2230/72* (2013.01)

(58) Field of Classification Search
None
See application file for complete search history.

(56) References Cited

U.S. PATENT DOCUMENTS

| | | |
|---|---|---|
| 5,319,179 A | 6/1994 | Joecks |
| 8,206,488 B2 | 6/2012 | Mantkowski |

(Continued)

FOREIGN PATENT DOCUMENTS

| | | |
|---|---|---|
| CN | 1725442 A | 1/2006 |
| CN | 1798867 A | 7/2006 |
| CN | 101097864 A | 1/2008 |

(Continued)

OTHER PUBLICATIONS

Unofficial English Translation of Chinese Office Action issued in connection with corresponding CN Application No. 201280041963.5 on Feb. 28, 2015.

(Continued)

*Primary Examiner* — Eric Golightly
(74) *Attorney, Agent, or Firm* — General Electric Company; Pamela A. Kachur

(57) ABSTRACT

Methods and apparatuses by which an oxidized metallic surface can be prepared for a subsequent repair operation without excessive removal of parent metal material. At least one gas is supplied to a limited portion of a metallic surface of a component, and the limited portion is locally heated in the presence of the gas to a treatment temperature sufficient to cause the gas or a gas that forms therefrom to chemically remove oxides from the limited portion of the metallic surface. At least a second portion of the metallic surface is not locally heated to the treatment temperature.

13 Claims, 2 Drawing Sheets

(56) References Cited

U.S. PATENT DOCUMENTS

| | | |
|---|---|---|
| 2004/0134427 A1 | 7/2004 | Derderian et al. |
| 2006/0016783 A1 | 1/2006 | Wu et al. |
| 2007/0087208 A1 | 4/2007 | Ng |
| 2010/0108107 A1 | 5/2010 | Mantkowski |

FOREIGN PATENT DOCUMENTS

| | | |
|---|---|---|
| EP | 1316628 A2 | 6/2003 |
| WO | 2007003615 A1 | 1/2007 |

OTHER PUBLICATIONS

Search Report and Written opinion from corresponding International Application No. PCT/US2012/052984, dated Nov. 6, 2012.

US 9,205,509 B2

LOCALIZED CLEANING PROCESS AND APPARATUS THEREFOR

CROSS REFERENCE TO RELATED APPLICATIONS

This application claims the benefit of U.S. Provisional Application No. 61/529,622 filed Aug. 31, 2011, the contents of which are incorporated herein by reference.

BACKGROUND OF THE INVENTION

The present invention generally relates to cleaning methods and equipment. More particularly, this invention relates to cleaning methods and equipment suitable for cleaning oxidized surfaces of components, for example, internal surfaces of turbine airfoil components, and to the subsequent repair of such components.

Internal cooling of components, for example, combustor liners and turbine blades (buckets) and vanes (nozzles) of gas turbine engines, is commonly employed to reduce their service temperatures, which allows the engine to operate more efficiently at higher temperatures. Air-cooled components of a gas turbine engine typically require that the cooling air flow is routed through a cooling circuit within the component before being discharged through carefully configured cooling holes (or slots) that distribute a cooling film over the component surface to increase the effectiveness of the cooling flow. Processes by which cooling holes are formed and configured are critical because the size, shape and surface conditions of each cooling hole opening determine the amount of air flow exiting the holes and affect the overall flow distribution within the cooling circuit containing the holes.

Air-cooled components located in the high temperature sections of gas turbine engines are typically formed of superalloys. Strenuous high temperature conditions to which these components are subjected during engine operation can lead to various types of damage or deterioration. For example, erosion, cracks and other surface discontinuities tend to develop at the tips and trailing edges of turbine blades and vanes during service due to foreign object impact (foreign object damage, or FOD). Because the material and processing costs of superalloys are relatively high, repair of damaged or worn superalloy components is typically preferred over replacement.

FIG. 1 schematically represents the blade tip region of a high pressure turbine blade 10. Deep tip cracks 12 are present in the blade tip and penetrate cooling holes 14 within the tip. Deep tip cracks of the type represented in FIG. 1 can be repaired by first mechanically routing out the crack to remove oxidized metal material and thereby yield a clean, wettable surface that can be repaired, for example, by tungsten inert gas (TIG) welding. However, mechanical routing can lead to excessive material removal, which has the effect of enlarging the crack in the parent material to the extent that molten weld material is more readily able to penetrate the wall of a component. In the case of an air-cooled turbine airfoil component such as the blade 10, the surface tension of molten weld material that has penetrated a wall can cause the weld material to form bumps within the cooling passages of the blade 10, a phenomenon sometimes referred to as drop-through. In addition to undesirably increasing the weight to the repaired blade, the drop-through weld material may constrict air flow through the cooling air circuit within the blade 10.

In view of the above, it would be advantageous if a repair process were available that was able to produce a repairable surface that conserves parent metal material, yet provides a clean, wettable surface capable of accepting a weld repair. It would be further advantageous to provide a repaired turbine blade that incurs little or no weight penalty as a result of undergoing a repair process.

BRIEF DESCRIPTION OF THE INVENTION

The invention provides a method and apparatus by which an oxidized metallic surface can be prepared for a subsequent repair operation without excessive removal of parent metal material. As an example, surface oxides can be selectively cleaned from the parent metal material to provide a wettable surface for a subsequent weld repair operation. The method preferably does not enlarge cracks in the metal material, so that the size of a crack can be maintained throughout the cleaning process.

According to a first aspect of the invention, the method includes supplying at least one gas to a limited portion of a metallic surface of a component, and locally heating the limited portion of the metallic surface in the presence of the at least one gas. The limited portion of the component is heated to a treatment temperature sufficient to cause the at least one gas or a gas that forms therefrom to chemically remove oxides from the limited portion of the metallic surface and not from at least a second portion of the metallic surface that is not locally heated to the treatment temperature.

According to a second aspect of the invention, the apparatus includes means for supplying at least one gas to a limited portion of a metallic surface of a component, and means for locally heating the limited portion of the metallic surface. The apparatus is adapted to locally heat the limited portion in the presence of the at least one gas to a treatment temperature sufficient to cause the at least one gas or a gas that forms therefrom to chemically remove oxides from the metallic surface thereof and not from at least a second portion of the metallic surface that is not locally heated to the treatment temperature.

A technical effect of the invention is the ability to conserve parent metallic surface material, which reduces or avoids the incidence of drop-through when attempting to repair a component having internal passages.

Other aspects and advantages of this invention will be better appreciated from the following detailed description.

DETAILED DESCRIPTION OF THE INVENTION

Figure 1:
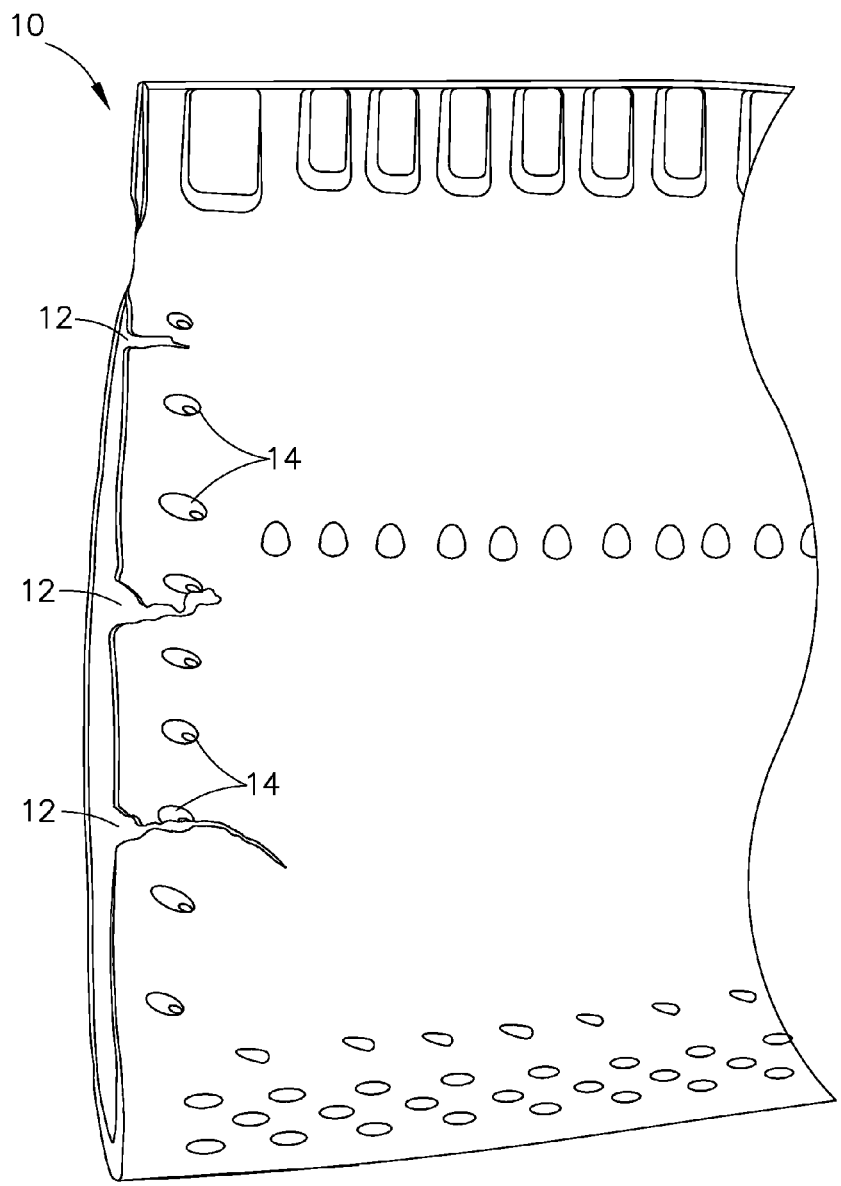
FIG. 1 represents a side view of a portion of a high pressure turbine blade, including a blade tip region that is in need of repair as evidenced by cracks.
Figure 2:
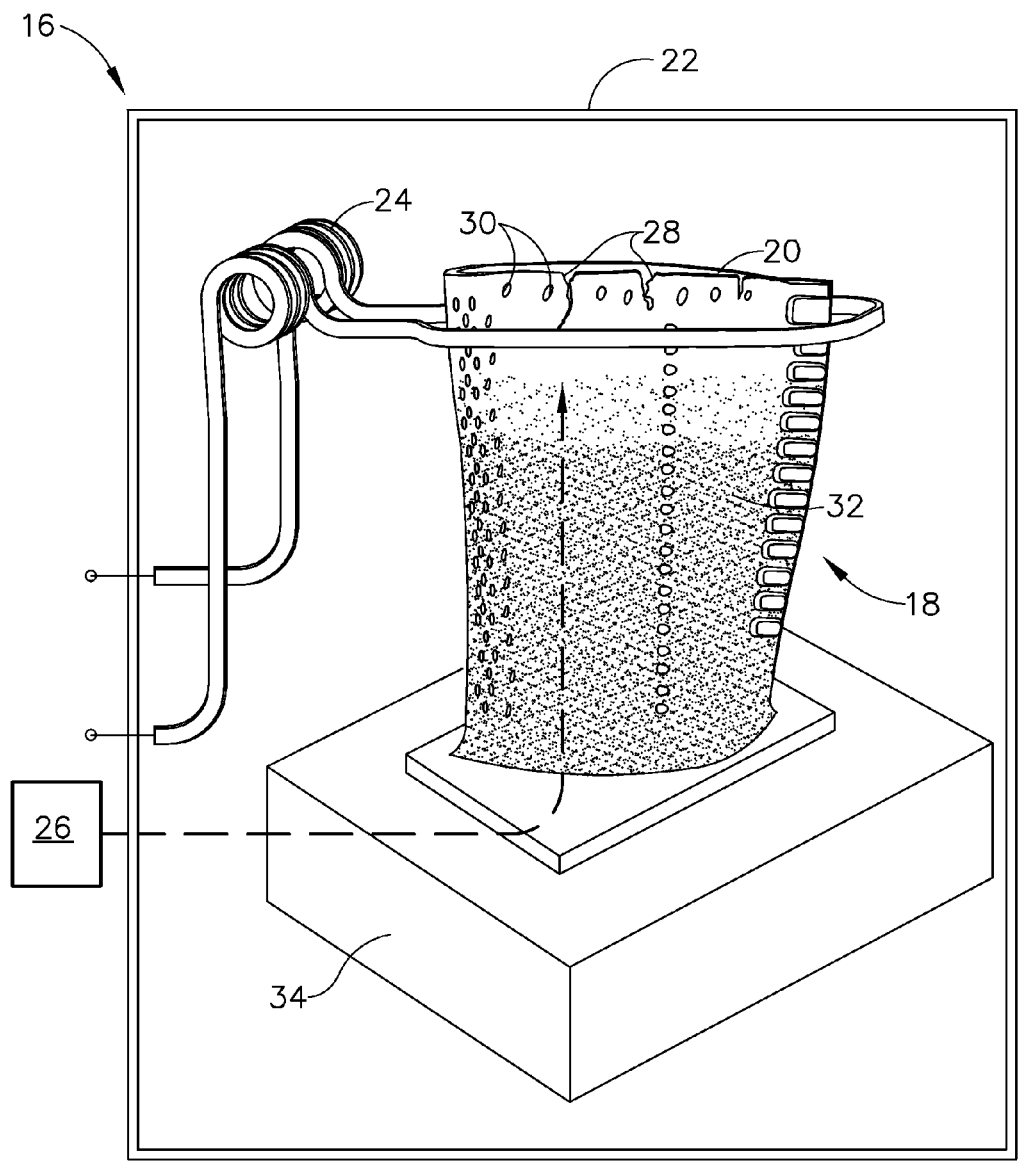
FIG. 2 is a perspective view of an apparatus prepared to perform a cleaning process on a blade tip region of a turbine blade in accordance with an embodiment of the invention.

FIG. 2 schematically represents an apparatus 16 adapted to perform a process by which a metallic surface can be prepared for a repair operation without the unnecessary removal of parent metal material. In particular, the apparatus 16 is preferably adapted to selectively prepare surfaces of a component, which in the illustrated example includes surface regions in proximity to a blade tip 20 of a high pressure turbine blade 18, for subsequent weld repair by chemically removing surface oxides from the parent metal material to yield a wettable surface for weld repair. The apparatus 16 is represented as comprising a cleaning vessel or chamber 22, an induction coil 24 adapted as a means for heating the blade tip 20 within the chamber 22, and a source of a feedstock 26 that is introduced into chamber 22 as well as into the interior of the blade 18.

FIG. 2 represents a nonlimiting example of a repair scenario in which a limited portion of the blade 18 that requires repair is a blade tip region of the blade 18 that extends a limited distance, for example, roughly one-half inch (about 1.3 cm), from the blade tip 20. The blade 18 is represented in FIG. 2 as having blade tip cracks 28 within such a region, as well as cooling holes 30 in close proximity to the cracks 28, and in some cases intersecting the cracks 28. The apparatus 16 serves to clean surfaces within and around the cracks 28, after which the cracks 28 can be filled with a repair material. The material of the blade 18 may be an equiaxed, directionally solidified, or single-crystal alloy, whereas the repair material will typically be formed of an alloy whose base material is the same as that of the blade 18. Following cleaning, the portion of the blade 18 at its blade tip 20 is preferably able to readily accept a weld repair as a result of the surfaces surrounding the cracks 28 being free of oxides.

Prior to cleaning the cracks 28, exterior surfaces of the blade 18 are preferably stripped of coatings, for example, metallic and intermetallic environmental coatings including diffusion aluminide and platinum aluminide coatings. Such coatings can be stripped in accordance with known practices, for example, using an acid cleaning process known in the art. The external coating or coatings are preferably stripped from the blade tip region to be cleaned, as well as from the remaining portions of the blade airfoil 32 that are spaced apart from the blade tip 20 by the blade tip region. Coatings present on internal features of the blade 18, for example, cooling circuits, are preferably masked with a suitable maskant during the stripping of external coatings. After any coatings on the external surfaces of the blade 18 have been removed, the internal maskant is preferably removed, for example, by heating the blade 18 if the maskant is formed of an organic material. As known in the art, the stripping process may require repetition until all external coatings are removed. However, the process of chemically stripping metallic and intermetallic coatings from surfaces of the blade 18 does not remove oxides and other refractory materials that may be present within the cracks 28 and on surfaces of the blade 18 adjacent the cracks 28. As known in the art, the presence of oxides and refractory materials on surfaces of the blade 18 that require weld repair inhibit wetting of the surfaces by a weld filler material. Reduced wetting necessitates the use of a relatively larger amount of weld filler material to complete the repair, which in turn increases the risk of weld dropthrough.

For the purpose of cleaning oxides and refractory materials from surfaces of the blade 18 in and around the cracks 28, the present invention preferably makes use of a chemical cleaning technique. As an example, hydrogen fluoride gas can be utilized in a fluoride ion cleaning (FIC) technique to chemically react and remove oxides that form on the surfaces of the blade 18, for example, alumina and chromia, as exemplified by the following reactions:

$$6HF+Al_2O_3 \rightarrow 2AlF_3+3H_2O$$

$$6HF+Cr_2O_3 \rightarrow 2CrF_3+3H_2O$$

These reactions yield volatile fluorides that sublime at high temperatures, but are relatively inert at temperatures below about 1400° F. (about 760° C.). Other oxides are also capable of reacting with hydrogen fluoride in similar fashion.

Though hydrogen fluoride gas can be used as the feedstock 26 and directly applied to surfaces of the cracks 28 and surfaces of the blade 18 in immediate proximity to the cracks 28, preferred feedstocks 26 are initially nonreactive with oxides and must be sufficiently heated in order to remove oxides from the cracks 28. More preferably, the feedstock 26 is a gas that is nonreactive with oxides, but undergoes a conversion at an elevated temperature to form hydrogen fluoride or another gas that is capable of reacting with and removing oxides from a metallic surface. Notable examples are fluoride-containing feedstocks 26 that can generate hydrogen fluoride gas when sufficiently heated. Nonlimiting examples include fluorocarbons that can be thermally decomposed after mixing with hydrogen to form hydrogen fluoride gas. A particular example is R-134a (1,1,1,2-tetrafluoroethane), which can be thermally decomposed to form hydrogen fluoride gas according to the following reaction:

$$C_2H_2F_4+5H_2 \rightarrow 4HF+2CH_4$$

Examples of suitable processes for in situ generation of hydrogen fluoride gas are described in more detail in U.S. Pat. No. 8,206,488 and U.S. Patent Application Publication No. 2010/0108107.

According to another preferred aspect of the invention, the apparatus 16 is configured for the selective in situ generation of hydrogen fluoride within only those portions of the blade 18 that are to undergo repair, for example, the cracks 28 at the blade tip 20, and would therefore benefit from the removal of oxides and potentially other refractory compounds. As evident from FIG. 2, the apparatus 16 can be configured such that its induction coil 24 (or another suitable heating means) can be disposed immediately adjacent the blade tip 20 to achieve localized and selective heating of a limited portion of the blade 18 in proximity to the blade tip 20. The induction coil 24 is a notable example of a particularly suitable heating means for use with the invention in that the coil 24 is capable of selectively heating the blade tip 20 to a controllable high temperature. In addition, the coil 24 can be configured to correspond in shape to the complex geometry of the blade tip 20, as well as limited portions of other components that require a similar treatment. In the example previously described, the coil 24 can be configured to selectively heat the surface of the blade 18 within about one-half inch (about 1.3 cm) of the blade tip 20, and can be used to heat this limited region to a temperature sufficient to thermally decompose a fluoride-containing feedstock 26 in the presence of hydrogen to form hydrogen fluoride. Preferably, the remaining regions of the blade 18 do not undergo the removal of oxides because they are not subjected to localized heating to the thermal decomposition temperature of the feedstock 26.

To avoid damage to any coating or metallic surfaces of the blade 18, the temperature of the material in the region of the blade tip 20 is preferably maintained below the melting point of any coating that may remain within the interior of the blade 18, for example, the diffusion zone associated with an aluminide coatings within the internal cooling circuit of the blade 18. For this purpose, particularly suitable temperatures for carrying out the cleaning process of this invention will typically be about 1150° C. or lower, though higher temperatures may be possible. Through the process of locally heating and cleaning the blade 18, other regions of the blade 18 (for example, the dovetail and internal blade features) will be subjected to minimal thermal stresses and preferably will not require masking to protect surfaces of the blade 18 apart from the blade tip 20. In effect, localized heating in the immediate vicinity of the cracks 28 allows other regions of the blade 18 to remain at temperatures below which the gas used to strip oxides from the cracks 28 is generated and present, such that the other regions of the blade 18 are effectively masked from the cleaning operation.

During the process of cleaning the blade tip 20, the entire blade 18 and induction coil 24 can be disposed within a controlled environment established within the chamber 22. As an example, the chamber 22 may be evacuated and backfilled with hydrogen gas, which is then available within the interior of the chamber 22 for reacting with the feedstock 26 to form hydrogen fluoride. The feedstock 26 may be introduced into the chamber 22 in any suitable manner, but in preferred embodiments is directly introduced into the interior of the blade 18, for example, through openings to the internal cooling circuit of the blade 18. As schematically represented in FIG. 2, openings to the internal cooling circuit are typically located in the root of the blade 18, which is enclosed by a pedestal 34 on which the blade 18 is supported within the chamber 22. In this manner, the feedstock 26 and hydrogen gas used to react the feedstock gas 26 are both present at the cooling holes 30 of the blade 18, though only those cooling holes 30 in the vicinity of the induction coil 24 are sufficiently heated to produce the hydrogen fluoride gas that will remove oxides from the surfaces of the cracks 28.

The cleaning treatment is preferably performed for a duration sufficient to remove oxides from the surfaces of the blade 18 in the vicinity of the blade tip 20 and particularly the cracks 28 located at the blade tip 20. Fifteen minutes is believed to be adequate in many cases, though longer and shorter durations are foreseeable. Thereafter, electrical power to the induction coil 24 can be turned off and the chamber 22 may be backfilled with an inert or otherwise nonreactive gas, for example, argon. Optionally, the temperature within the chamber 22 may be subsequently increased, for example, to a temperature of about 2200° F. (about 1200° C.) while a vacuum is drawn within the chamber 22 to remove any residual fluorine. Alternatively or in addition, the chamber 22 may be flushed with hydrogen gas to remove fluorine gas from the chamber 22.

Once oxides have been removed from surface regions of the blade 18 in and around the cracks 28, the blade 18 can be subjected to a suitable repair and/or rebuilding process. As a nonlimiting example, the blade 18 may be placed in a weld box and undergo tungsten inert gas (TIG) welding to repair the cracks 28. Because oxides were removed from the cracks 28 without mechanical intervention (for example, routing, grinding, etc.), the cracks 28 are preferably no larger than their size prior to the cleaning operation, such that the cracks 28 can be more readily filled with a suitable filler material. In the substantial absence of oxides on the surfaces of the cracks 28, a molten metallic filler material is able to wick into the cracks 28 while exhibiting less tendency for filler drop-through as compared to conventional repair processes that rely on mechanical intervention to remove oxides from the cracks 28.

In addition to repairing the cracks 28, further processing of the blade 18 may entail repairing or rebuilding other portions of the blade 18, for example, the repair or rebuilding of a squealer tip (not shown) at the blade tip 20. Once repairs of the blade 18 are completed, repaired/rebuilt portions of the blade 18 may undergo further processing, for example, deposition of a suitable metallic or intermetallic coating to replace or restore a coating that was removed prior to the cleaning process. As a nonlimiting example, at least the repaired portion of the blade 18 can be recoated with a diffusion aluminide or platinum aluminide coating using a chemical vapor deposition (CVD) technique. Following weld repair, the blade 18 may also undergo a suitable heat treatment to relieve stresses induced in the blade 18 as a result of the repair process.

As evident from the above, preferred embodiments of the present invention depart from conventional weld preparation processes in which oxides on surfaces of cracks would be removed by mechanical means such as routing or grinding. As such, the present invention is able to avoid problems associated with such conventional cleaning techniques, including the removal of additional parent metal that would result in the enlargement of the cracks 28 and an increased incidence of fill drop-through.

While the invention has been described in terms of specific embodiments, it is apparent that other forms could be adopted by one skilled in the art. For example, the physical configurations of the apparatus 16 and blade 18 could differ from those shown, and materials and processing parameters other than those noted could be used. Therefore, the scope of the invention is to be limited only by the following claims.

The invention claimed is:

1. A method comprising:
supplying at least one gas to a limited portion of a metallic surface of a component; and
locally heating the limited portion of the metallic surface in the presence of the at least one gas to a treatment temperature sufficient to cause the at least one gas or a gas that forms therefrom to chemically remove oxides from the limited portion of the metallic surface and not from at least a second portion of the metallic surface that is not locally heated to the treatment temperature.

2. The method according to claim 1, wherein the metallic surface is not subjected to means for mechanically removing the oxides from the limited portion of the metallic surface.

3. The method according to claim 1, wherein cracks are present in the limited portion of the metallic surface, and the locally heating step causes the oxides to be chemically removed from surfaces of the cracks.

4. The method according to claim 3, further comprising performing a weld repair process to fill the cracks after removal of the oxides from the surfaces thereof.

5. The method according to claim 1, wherein the oxides are chemically removed from the limited portion of the metallic surface by fluoride ion cleaning.

6. The method according to claim 5, wherein the at least one gas is a fluoride-containing gas, the locally heating step is performed in the presence of hydrogen gas and causes the fluoride-containing gas to react with the hydrogen gas to form hydrogen fluoride at the limited portion of the component and not at the second portion of the component, and the hydrogen fluoride chemically removes the oxides from the limited portion of the metallic surface during the locally heating step.

7. The method according to claim 6, wherein the fluoride-containing gas is a fluorocarbon.

8. The method according to claim 1, wherein the component has an internal surface and a metallic or intermetallic coating thereon, and the treatment temperature is below a melting point of the coating so as not to damage the coating and the metallic surface of the component during the locally heating step.

9. The method according to claim 1, wherein the locally heating step is performed with an induction coil that surrounds the limited portion of the component and not the second portion of the component.

10. The method according to claim 1, wherein the component is a turbine airfoil component.

11. The method according to claim 10, wherein the limited portion of the component is a blade tip region thereof.

12. The method according to claim 11, wherein the second portion of the component is an airfoil portion spaced apart from the blade tip by the blade tip region.

13. The method according to claim 10, wherein portions of the metallic surface located externally of the component are stripped of a metallic and/or intermetallic coating prior to the locally heating step.

* * * * *